United States Patent
Golovin et al.

[11] Patent Number: 6,087,029
[45] Date of Patent: Jul. 11, 2000

[54] WATER RECOVERY USING A BI-DIRECTIONAL AIR EXCHANGER FOR A METAL-AIR BATTERY

[75] Inventors: Neal Golovin, Marietta; Chris Koehly, Dunwoody, both of Ga.; Kendall R. Pearson, Bend, Oreg.; Daniel J. Brose, Bend, Oreg.; Walter F. Burns, Bend, Oreg.

[73] Assignee: AER Energy Resources, Inc., Smyrna, Ga.

[21] Appl. No.: 09/013,379

[22] Filed: Jan. 6, 1998

[51] Int. Cl.[7] ............................ H01M 12/00; H01M 2/00; B01D 53/22

[52] U.S. Cl. ........................... 429/27; 429/72; 429/83; 95/52; 96/4

[58] Field of Search .................. 429/27, 71, 72, 429/82, 83, 86, 120, 148; 95/52

[56] References Cited

U.S. PATENT DOCUMENTS

| | | |
|---|---|---|
| 971,737 | 10/1910 | Ekströmer . |
| 2,468,430 | 4/1949 | Derksen et al. . |
| 3,072,284 | 1/1963 | Luhman, Jr. . |
| 3,124,487 | 3/1964 | Duddy et al. . |
| 3,160,528 | 12/1964 | Dengler et al. . |
| 3,411,951 | 11/1968 | Gelting . |
| 3,436,270 | 4/1969 | Oswin et al. . |
| 3,473,963 | 10/1969 | Sanderson et al. . |
| 3,513,032 | 5/1970 | Warszawski . |
| 3,532,548 | 10/1970 | Stachurski . |
| 3,533,845 | 10/1970 | Katsoulis . |
| 3,600,233 | 8/1971 | Coffey et al. . |
| 3,615,860 | 10/1971 | Terlecke . |
| 3,716,413 | 2/1973 | Eisner . |
| 3,744,516 | 7/1973 | Rowe . |
| 3,871,920 | 3/1975 | Grebier et al. . |
| 3,909,302 | 9/1975 | Mermelstein . |
| 3,975,210 | 8/1976 | Warnock . |
| 3,977,901 | 8/1976 | Buzzelli . |
| 4,112,198 | 9/1978 | Przybyla et al. ........................ 429/29 |
| 4,112,199 | 9/1978 | Dunlop et al. .......................... 421/29 |
| 4,118,544 | 10/1978 | Przybyla et al. ........................ 429/27 |
| 4,152,489 | 5/1979 | Chottiner .............................. 429/27 |
| 4,177,327 | 12/1979 | Mathews et al. ....................... 429/27 |
| 4,180,624 | 12/1979 | Winsel ................................ 429/54 |
| 4,246,324 | 1/1981 | de Nora et al. ........................ 429/17 |
| 4,298,666 | 11/1981 | Taskier ............................... 429/206 |
| 4,359,510 | 11/1982 | Taskier ............................... 429/144 |
| 4,457,215 | 7/1984 | Vogt . |
| 4,484,691 | 11/1984 | Lees .................................. 220/89 A |
| 4,521,497 | 6/1985 | Tamminen ............................. 429/27 |
| 4,591,539 | 5/1986 | Oltman et al. ........................ 429/27 |
| 4,615,955 | 10/1986 | AMakawa et al. ...................... 429/34 |
| 4,626,482 | 12/1986 | Hamlen et al. ........................ 429/27 |
| 4,729,930 | 3/1988 | Beal et al. ........................... 429/13 |
| 4,745,038 | 5/1988 | Brown ................................ 429/27 |
| 4,795,683 | 1/1989 | McElroy .............................. 429/13 |

(List continued on next page.)

FOREIGN PATENT DOCUMENTS

| | | |
|---|---|---|
| 0 294 327 | 12/1988 | European Pat. Off. . |
| 50-40773 | 12/1975 | Japan . |
| 58-166673 | 10/1983 | Japan . |
| 90/11625 | 10/1990 | WIPO . |
| 95/21469 | 8/1995 | WIPO . |

OTHER PUBLICATIONS

The Search for Bettery Batteries; IEEE Spectrum, May 1995; pp. 51–56.

*Primary Examiner*—Maria Nuzzolillo
*Assistant Examiner*—Jonathan Crepeau
*Attorney, Agent, or Firm*—Jones & Askew, LLP

[57] ABSTRACT

A bi-directional air exchanger for a metal-air battery having a housing. The air exchanger includes an ambient air passageway for a first flow of air in a first direction, a battery exhaust passageway for a second flow of air in a second direction, and one or more membranes. The ambient air passageway and the battery exhaust passageway are separated within the housing by the one or more membranes such that the first and the second flows of air are in fluid communication with one another for the exchange of humidity.

36 Claims, 7 Drawing Sheets

U.S. PATENT DOCUMENTS

| | | | |
|---|---|---|---|
| 4,823,679 | 4/1989 | Robbins . | |
| 4,826,741 | 5/1989 | Aldhart et al. | 429/19 |
| 4,894,295 | 1/1990 | Cheiky | 429/77 |
| 4,913,983 | 4/1990 | Cheiky | 429/13 |
| 4,934,148 | 6/1990 | Prasad et al. . | |
| 4,950,561 | 8/1990 | Niksa et al. | 429/27 |
| 4,973,530 | 11/1990 | Vanderborgh et al. | 429/13 |
| 5,024,904 | 6/1991 | Curiel | 429/27 |
| 5,080,005 | 1/1992 | Kolt | 454/359 |
| 5,084,364 | 1/1992 | Quaadvliet | 429/34 |
| 5,141,826 | 8/1992 | Böhm et al. | 429/120 |
| 5,147,736 | 9/1992 | Lapp | 429/27 |
| 5,160,511 | 11/1992 | Lovelock . | |
| 5,183,222 | 2/1993 | Ramsey, Jr. | 244/53 R |
| 5,191,274 | 3/1993 | Lloyd et al. | 429/27 X |
| 5,196,275 | 3/1993 | Goldman et al. | 429/27 |
| 5,206,576 | 4/1993 | Jasinski | 429/27 X |
| 5,208,526 | 5/1993 | Goldman et al. | 429/27 X |
| 5,240,472 | 8/1993 | Sircar | 95/52 |
| 5,258,239 | 11/1993 | Kobayashi | 429/27 |
| 5,260,144 | 11/1993 | O'Callaghan | 429/14 |
| 5,306,578 | 4/1994 | Ohashi et al. | 429/27 |
| 5,306,579 | 4/1994 | Shepard, Jr. et al. | 429/40 |
| 5,318,861 | 6/1994 | Harats et al. | 429/21 |
| 5,328,777 | 7/1994 | Bentz et al. | 429/27 |
| 5,328,778 | 7/1994 | Woodruff et al. | 429/27 |
| 5,354,625 | 10/1994 | Bentz et al. | 429/17 |
| 5,356,729 | 10/1994 | Pedicini | 429/27 |
| 5,362,577 | 11/1994 | Pedicini | 429/27 |
| 5,366,822 | 11/1994 | Korall et al. | 429/27 |
| 5,382,478 | 1/1995 | Chow et al. | 429/26 |
| 5,387,477 | 2/1995 | Cheiky | 429/26 |
| 5,418,080 | 5/1995 | Korall et al. | 429/27 |
| 5,447,805 | 9/1995 | Harats et al. | 429/27 |
| 5,456,994 | 10/1995 | Mita | 429/71 |
| 5,506,067 | 4/1996 | Tinker | 429/27 |
| 5,554,452 | 9/1996 | Delmolino et al. | 429/10 |
| 5,560,999 | 10/1996 | Pedicini et al. | 429/27 |
| 5,567,114 | 10/1996 | Wallace | 415/146 |
| 5,569,551 | 10/1996 | Pedicini et al. | 429/27 |
| 5,571,630 | 11/1996 | Cheiky | 429/26 |
| 5,691,074 | 11/1997 | Pedicini | 429/27 |

| Membrane Material | Permeability (Barrer) Oxygen | Water Vapor | $H_2O/O_2$ Selectivity |
|---|---|---|---|
| Polydimethylsiloxane (silicone rubber) | 48.9 | 4,306 | 88 |
| Poly(vinyl alcohol) (hydrogel) | 0.0005 | 4,200 | 8,076,923 |
| Cellulose hydrate (regenerated cellulose) (hydrogel) | 0.0002 | 2,519 | 11,812,500 |
| Ethyl cellulose (plasticized) | 2.7 | 1,300 | 491 |
| Ethyl cellulose (potential hydrogel) | 1.5 | 893 | 609 |
| Cellulose acetate | 0.078 | 750 | 9,615 |
| Cellulose nitrate | 0.19 | 629 | 3,233 |
| Polyurethane | 0.30 | 600 | 2,000 |
| Polyoxy-2,6-dimethyl-1,4-phenylene | 1.6 | 406 | 256 |
| Polyethylemethacrylate (potential hydrogel) | 0.12 | 317 | 2,674 |
| Polyacrylonitrile-co-styrene | 0.047 | 253 | 5,429 |
| Polyamide (Nylon 6,6) | 0.001 | 252 | 210,000 |
| Polyamide (Nylon 6) | 0.002 | 242 | 151,250 |
| Polymethacrylonitrile-co-styrene | 0.11 | 200 | 1,852 |
| Polystyrene | 0.25 | 180 | 711 |
| Poly(butadiene-acrylonitrile)(35%) | 0.16 | 175 | 1,094 |
| Polyoxycarbonyl-1,4-phenylene | 0.14 | 140 | 1,000 |
| Polysulfone | 0.11 | 120 | 1,091 |
| Polystyrene (biaxially oriented) | 0.27 | 112 | 420 |
| Polyamide (modified Nylon 6,6) | 0.003 | 110 | 39,286 |
| Polychloroprene | 0.39 | 91 | 231 |
| Polyacrylonitrile | 0.001 | 65 | 119,512 |
| Polymethylmethacrylate (potential hydrogel) | 0.015 | 64 | 4,138 |
| Poly-5,7-dihydro-1,3,5,7-tetraoxy | 0.23 | 57 | 254 |
| Polyoxymethylene | 0.008 | 56 | 7,404 |
| Polytransisoprene | 0.62 | 51 | 82 |

*Fig. 3*

☒ Control: Aluminum Foil (0.027 g/hr)
○ Thick Silicone Rubber (0.022 g/hr)
■ Silicone Rubber on Celgard (0.015 g/hr)
x Thin-Film-Composite Silicone Rubber (0.006 g/hr)

| Membrane | | Water Loss with Dry Feed (- g/hr) | Water Gain with Humid Feed (+ g/hr) |
|---|---|---|---|
| Aluminum Foil Control (160 cm$^2$ flat sheet) | 1st Hour<br>2nd Hour<br>3rd Hour | 1.5<br>0.8<br>0.8 | 0.9<br>--<br>-- |
| Silicone Rubber on Celgard (160 cm$^2$ flat sheet) | 1st Hour | 1.2 | -- |
| Hydrogel Wound Dressing (160 cm$^2$ flat sheet) | 1st Hour<br>2nd Hour<br>3rd Hour | 0.7<br>0.8<br>0.6 | 1.0<br>0.8<br>-- |
| Silicone Rubber on Polysulfone (410 cm$^2$ hollow fiber) | 1st Hour<br>2nd Hour<br>3rd Hour<br>4th Hour | 0.5<br>0.5<br>0.5<br>0.4 | 0.3<br>0.4<br>0.5<br>0.5 |
| Polyamide Thin-Film Composite on Polysulfone (410 cm$^2$ hollow fiber) | 1st Hour<br>2nd Hour<br>3rd Hour | 0.4<br>0.4<br>0.4 | --<br>--<br>-- |

*Fig. 14*

WATER RECOVERY USING A BI-DIRECTIONAL AIR EXCHANGER FOR A METAL-AIR BATTERY

TECHNICAL FIELD

The present invention relates generally to batteries, and more particularly relates to a bi-directional air exchanger system for humidity control in a metal-air battery.

BACKGROUND OF THE INVENTION

Metal-air battery cells include an air permeable cathode and a metallic anode separated by an aqueous electrolyte. During discharge of a metal-air battery, such as a zinc-air battery, oxygen from the ambient air is converted at the cathode to hydroxide, zinc is oxidized at the anode by the hydroxide, and water and electrons are released to provide electrical energy. A metal-air battery has a relatively high energy density because the cathode utilizes oxygen from the ambient air as a reactant in the electrochemical reaction rather than a heavier material such as a metal or metallic composition. Metal-air battery cells are often arranged in a common housing for a multiple-cell battery pack. Such a multiple-cell battery pack provides a relatively lightweight battery with a significantly long run time.

A steady supply of oxygen is necessary for the metal-air battery cells to provide electricity. Known metal-air batteries typically use an air manager system of a fan within a housing containing the cells. The fan sweeps a continuous flow of ambient air across the cells at a flow rate sufficient to achieve the desired power output. Such an arrangement is shown in U.S. Pat. No. 4,913,983 to Cheiky. Cheiky uses a fan within a battery housing to supply a sufficient flow of ambient air to a pack of metal-air cells. When the battery is turned on, an air inlet and an air outlet are opened and the fan is activated to create the flow of air into, through, and out of the housing.

Although a sufficient flow of ambient air is needed for the metal-air cells to produce electricity, the level of humidity in this air flow can have a significant impact on the operation of the cells. Once exposed to the ambient air, the humidity level within the battery housing will seek equilibrium with the ambient humidity level. The relative humidity within a metal-air battery housing is generally about forty-five percent (45%). If the ambient humidity level is greater than the humidity level within the battery housing, the electrolyte within the housing will absorb water from the air through the cathode and fail due to a condition called "flooding". Flooding may cause the battery housing to burst or leak. If the ambient humidity is less than the humidity within the battery housing, the metal-air battery will release water vapor from the electrolyte through the air cathode and may fail due to "drying out".

The art, therefore, has recognized that an ambient air humidity level differing from the humidity level within the battery housing will create a net transfer of water into or out of the battery housing as the respective humidity levels seek equilibrium. The transfer of humidity is particularly of concern when the battery is not in use. If uncontrolled, humidity will tend either to seep into or out of the battery housing over an extended period of time. This transfer of humidity will shorten the shelf-life of the battery as a whole or cause some or all of the cells to fail.

Maintaining a battery housing with consistent levels of humidity during non-use generally has required a sealed housing. Prior art systems, such as that discussed above by Cheiky, have used a fan of some sort to force ambient air through large openings in the battery housing during use. These openings are then sealed with a mechanical air door during non-use. If the air door is not present or is not shut during non-use, large amounts of ambient air will seep into the housing. This flow of air can cause the humidity transfer problems with the housing discussed above. The oxygen in the ambient air also may cause the cells to discharge, thereby leading to "leakage" current and a reduction in cell efficiency and lifetime.

The assignee of the present invention is also the owner of application Ser. No. 08/544,707, entitled "Diffusion Controlled Air Door," filed Oct. 18, 1995, now U.S. Pat. No. 5,691,074, and application Ser. No. 08/556,613, entitled "Diffusion Controlled Air Vent and Recirculation Air Manager for a Metal-Air Battery," filed Nov. 13, 1995, now U.S. Pat. No. 5,919,582 (attached hereto as Exhibit A). These references disclose several preferred metal-air battery packs for use with the present invention and are incorporated herein by reference.

These metal-air battery packs have a housing with an air inlet opening and an air outlet opening both sized with a length in the direction through the thickness of the housing being greater than a width in the direction perpendicular to the thickness of the housing. The openings are unobstructed and are sized to eliminate substantially the air flow into the air inlet opening and out of the air outlet opening when the fan is turned off. By "eliminate substantially", it is meant that the rate of diffusion of oxygen, humidity, or contaminates through the openings is not a concern during non-use of the battery. The respective diffusion rates are so slow that the humidity transfer or drain current is sufficiently small such that they have little appreciable impact on the efficiency or lifetime of the battery.

Although both the mechanical air door systems and the open air door systems may prevent the transfer of humidity through the housing during non-use of the battery, these systems do not have a significant impact on the regulation of the humidity level during use. One method to limit the transfer of humidity during use is shown in commonly-owned U.S. Pat. No. 5,356,729 to Pedicini. This reference describes the use of ventilation openings that are preferentially sized for the diffusion of oxygen into the housing upon the reduction of the oxygen concentration within the housing during use. By preferentially diffusing oxygen into the housing, the need of the cells for oxygen is met while maintaining a more stable water vapor and humidity equilibrium within the housing. Although this disclosure somewhat reduces the transfer of humidity during use, this system does not eliminate such transfer.

Other known system have attempted to resolve this problem through the use of a recirculating air manager. For example, commonly-owned U.S. Pat. No. 5,560,999 to Pedicini, et al. describes an air manager system that recirculates the reactant air through the battery housing and exchanges only a minimal amount of the recirculated air for the ambient air to maintain a sufficient oxygen concentration in the battery. The amount of oxygen admitted may be increased or decreased depending upon the load on the battery. The battery housing also may include a humidifier in the recirculating air pathway to humidify the recirculated reactant air as determined by a humidity monitor.

Although these disclosed devices and methods are helpful in limiting the exchange of humidity into or out of the battery housing, these designs require monitoring devices and complex air manager systems to maintain the proper humidity levels. These designs can be expensive to manufacture and difficult to use. Further, these known devices do not completely eliminate the transfer of humidity during both use and non-use of the battery. Changes in the ambient humidity level will still have an impact on the operation of the battery regardless of the known safeguards.

What is needed, therefore, is a humidity control system that can accommodate varying humidity levels via a relatively simple air manager design. This air manager system must be capable of regulating the humidity level within the battery housing both during use and non-use without the need for complex monitoring systems and humidifiers.

SUMMARY OF THE INVENTION

The present invention provides a bi-directional air exchanger for a metal-air battery having a housing. The air exchanger includes an ambient air passageway for a first flow of air in a first direction, a battery exhaust passageway for a second flow of air in a second direction, and one or more membranes. The ambient air passageway and the battery exhaust passageway are separated within the housing by the one or more membranes such that the first and the second flows of air are in fluid communication with one another for the exchange of humidity.

Specific embodiments include a membrane of a water-vapor permeable polymer with a water vapor permeability of at least about 50 barrer. The membrane is also selective for water vapor transport over oxygen transport with a water-vapor/oxygen selectivity of more than about eighty (80). The membrane may be a hydrogel. Specifically, the membrane may be from the group including cellulose hydrate (regenerated cellulose), ethyl cellulose, polyamide, polydimethylsiloxane, polyethylmethacrylate, polymethylmethacrylate, and poly-vinyl alcohol. The bidirectional air flow may be a counter-current air flow, a cross-current air flow, or other types of interacting air flows.

The housing may be a rectangular shape with two identical halves forming a central channel therethrough. The membrane may be a flat sheet shape positioned between the two halves of the housing. There also may be multiple membranes forming a sandwich between multiple air passageways. The housing also may be a hollow casing in a tubular or rectangular shape. The membranes may then be in the form of a plurality of hollow fibers. The hollow fibers form either the ambient air passageway or the battery exhaust passageway while the space within the housing that is not occupied by the hollow fibers forms the other passageway.

The air exchanger is used with a metal-air battery. The battery may have a housing or an air manager for enclosing at least one metal-air cell with an electrolyte reservoir, at least one air inlet for ambient air, and at least one air outlet for exhaust air. The air inlets have a length in the direction through the thickness of the housing greater than a width in the direction perpendicular to the thickness of the housing. A fan is positioned in communication with the housing to force the air into the air inlet and out of the air outlet. The air exchanger is positioned within or adjacent to the housing and connected with the air inlet and outlet such that the ambient air entering the housing and the exhaust air leaving the housing have a substantially equivalent humidity level.

A further embodiment of the present invention provides a humidity control system. The humidity control system includes at least one metal-air cell. The metal-air cell is positioned within an air manager. The air manager includes at least one air inlet and at least one air outlet. The humidity control system further includes humidity control means in communication with the air manager, such that humidity level of the air entering the air manager is substantially equivalent to the humidity level of the air leaving the air manager.

A further embodiment of the present invention provides a humidity control system. The humidity control system includes at least one metal-air cell. The metal-air cell has an electrolyte reservoir. The metal-air cell is positioned within an air manager. The air manager has at least one air inlet and at least one air outlet. The air manager also has a fan. The humidity control system further includes humidity control means having a hollow fiber membrane. The humidity control means is in communication with the air manager such that the humidity level of the air entering the air manager is substantially equivalent to the humidity level of the air leaving the air manager.

A further embodiment of the present invention provides a humidity control system. The humidity control system includes at least one metal-air cell. The metal-air cell is positioned within an air manager. The air manager includes at least one air inlet and at least one air outlet. The humidity control system also includes humidity control means having a housing. The housing has an ambient air passageway for a first flow of air in a first direction and a battery exhaust passageway for a second flow of air in a second direction, such that the humidity level of the air entering the air manager is substantially equivalent to the humidity level of the air leaving the air manager.

The method of the present invention controls the level of humidity in a metal-air battery having an air exchanger with an air inflow path, an air outflow path, and a membrane positioned between the air flow paths. The method includes the steps of drawing the air through the air inflow path of the air exchanger into the battery, circulating the air through the battery for the electrochemical reaction, forcing the air out of the battery back through the air outflow path of the air exchanger, and transferring the water vapor between the air in the inflow path and the air in the outflow path through the membrane such that the level of humidity within the battery remains substantially constant.

Thus, it an object of the present invention to provide an improved ventilation system for a metal-air cell or battery.

It is another object of the present invention to provide a bi-directional air exchanger system for a metal-air battery.

It is yet another object of the present invention to provide an improved method for maintaining the humidity level within a metal-air battery.

It is a further object of the present invention to provide an improved air exchanger for a metal-air battery.

It is a still further object of the present invention to provide an air exchanger for a metal-air battery that maintains a consistent humidity level within the battery housing.

It is a still further object of the present invention to provide a metal-air battery with a long shelf life.

It is a still further object of the present invention to provide an improved method for maintaining the humidity level within a metal-air battery.

Other objects, features and advantages of the present invention will become apparent upon reviewing the following description of preferred embodiments of the present invention, when taken in conjunction with the drawings and the appended claims.

BRIEF DESCRIPTION OF THE DRAWINGS

FIG. 3 is a chart showing certain materials with known values of permeability and selectivity for water-vapor and oxygen.

FIG. 14 is a chart showing the rate of water loss or gain from a KOH solution for various membrane materials and shapes.

DETAILED DESCRIPTION OF THE INVENTION

Flat Sheet Air Exchanger

Figure 1:
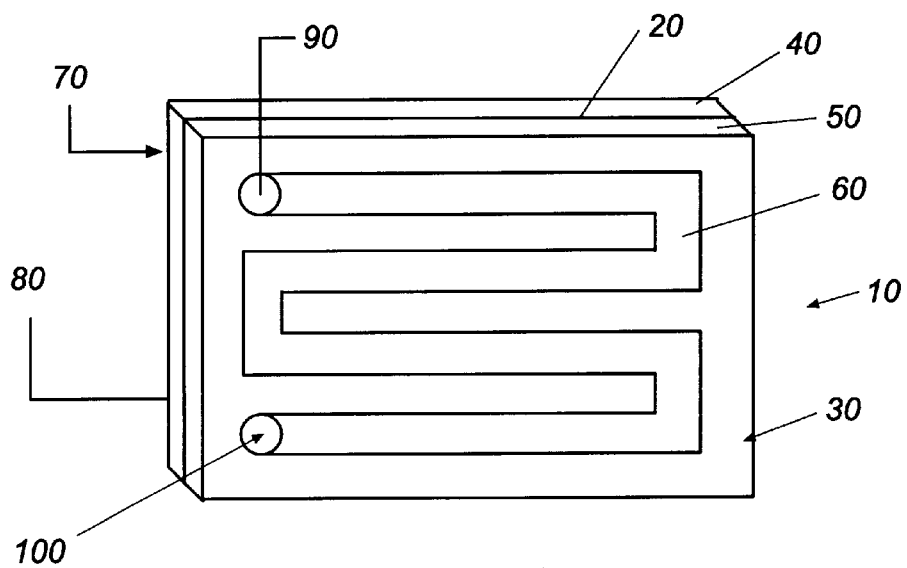
FIG. 1 is a plan view of the flat sheet air exchanger module.
Figure 2:
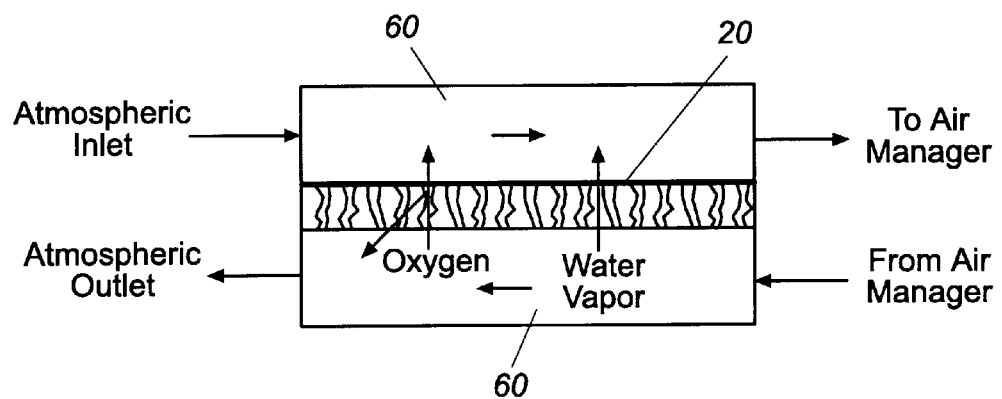
FIG. 2 is a partial cross-sectional view of the membrane in the flat sheet air exchanger module.

Referring now in more detail to the drawings, in which like numerals refer to like parts throughout the several views, FIGS. 1 and 2 show a flat sheet air exchanger 10 embodying the present invention. In this embodiment, the air exchanger 10 includes a membrane 20 surrounded by a housing 30. The housing 30 has two identical halves, a first half 40 and a second half 50. Each half 40, 50 has a matching air channel 60 formed therein. The air channels 60 in the respective halves 40, 50 overlay each other with the membrane 20 positioned therebetween. The air channel 60 on the first half 40 of the housing 30 has an atmospheric air in-port 70 and a battery out-port 80. The second half 50 of the housing 30 has an atmospheric air out-port 90 and a battery in-port 100.

The housing 30 is made from a lightweight plastic material such as a twenty (20) mil acrylic plastic or other conventional materials in which the air channels 60 can be formed. Because there is relatively little pressure within the housing 30, the housing material need only provide sufficient structural support to protect the membrane 20 from damage in transport or assembly. The housing 30 therefore may be relatively thin.

The membrane 20 is preferably a polymer with high selectivity for water vapor transport relative to oxygen transport. Specifically, the considerations in choosing a suitable membrane material include: (1) that the polymer has a high water-vapor permeability, which results in less membrane area required for a given separation; (2) that the polymer has a high water-vapor/oxygen selectivity, which results in a minimum oxygen loss in the housing 30 during use; and (3) that the polymer material is easily configured into a thin layer on a porous support such as a flat sheet or a hollow fiber shape.

The permeability of the material is often expressed in units of barrer, which is equivalent to $1 \times 10^{-10}$ cm$^3$ (STP)—cm/cm$^2$-cmHg-sec. FIG. 3 shows certain materials with known values of permeability and selectivity for water-vapor and oxygen. This table ranks the materials on the basis of water-vapor permeability. Silicone rubber and two different hydrogel materials, polyvinyl alcohol and cellulose hydrate, have the highest known water-vapor permeabilities. The hydrogel materials appear to be superior because of their high permeability and selectivity. These materials, however, are not always easy to configure into a very thin layer on a porous support. The selection of the membrane material therefore is a balance between the desired shape of the membrane and its performance. Suitable materials for the flat sheet air exchanger 10 embodiment include thin-film-composite (TFC) silicone rubber, silicone rubber on CELGARD® (a hydrophobic polypropylene that resists wetting by moisture, manufactured by Hoechst-Celanese Corporation of Charlotte, N.C.), and even thick silicone rubber.

The air exchanger 10 is designed to be used with any type of metal-air battery 110. The metal-air battery 110 may be similar to that disclosed in commonly owned U.S. Pat. No. 5,641,588 to Sieminski, et al., commonly owned U.S. Pat. No. 5,356,729 to Pedicini, et al., commonly owned U.S. Pat. No. 5,691,074 to Pedicini, commonly owned U.S. Pat. No. 5,919,582 to Pedicini, et al., which designs are incorporated herein by reference, or other known metal-air battery configurations.

Figure 4:
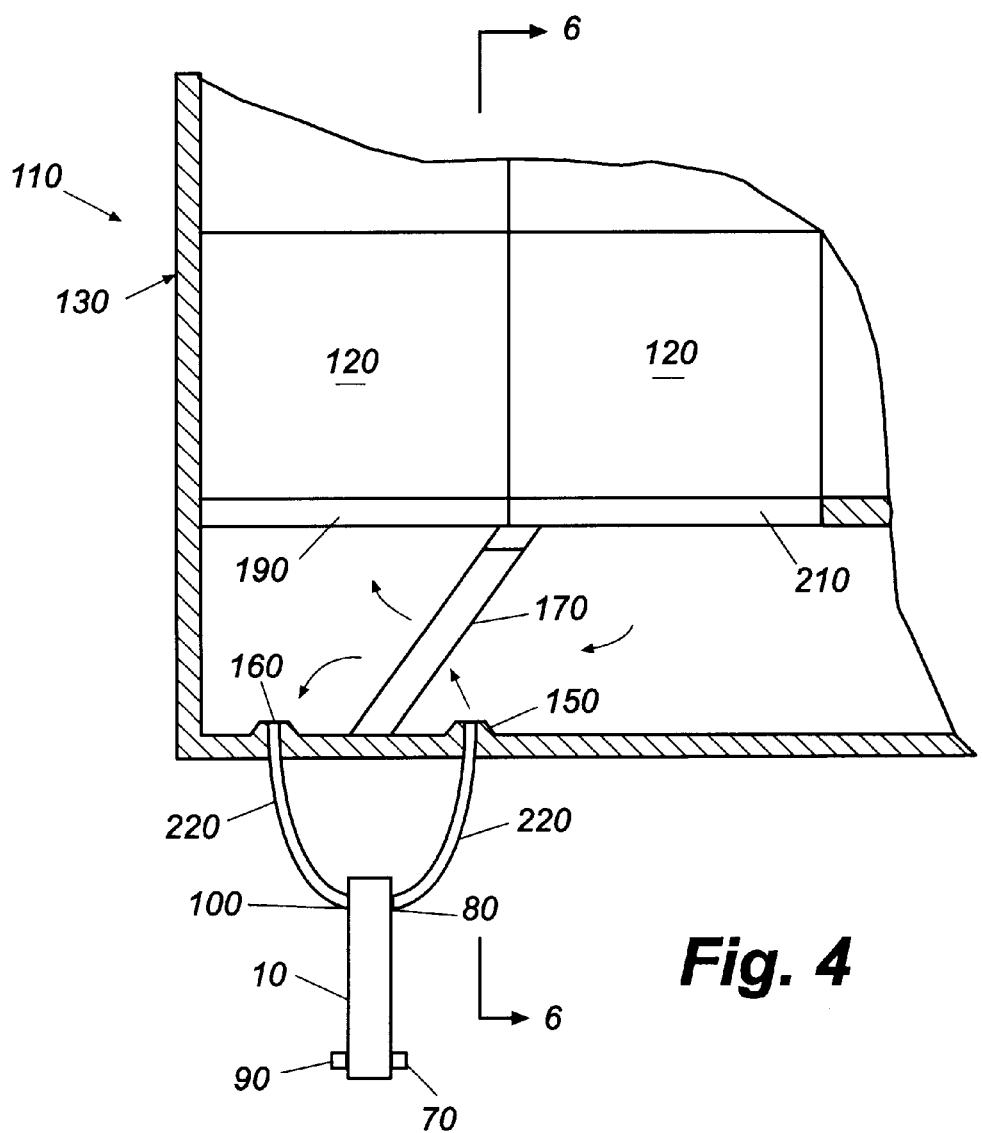
FIG. 4 is a cut-away diagrammatic top view of the battery housing, showing the position of the cells, the fan, the air openings, and the air exchanger module.
Figure 6:
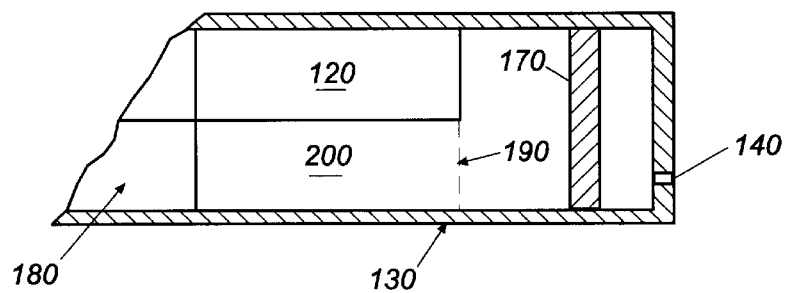
FIG. 6 is a vertical cross sectional view taken along line 6—6 of FIG. 4.

The metal-air battery 110 of FIG. 4 includes a plurality of metal-air cells 120 enclosed within a housing 130. The housing 130 may be any type of conventional, substantially air-tight structure. The housing 130 isolates the cells 120 from the outside air with the exception of a plurality of ventilation openings 140. In the embodiment shown in FIG. 4, a single air inlet opening 150 and a single air outlet opening 160 are utilized. The number of the openings 140 is not as important as the aggregate size of the openings 140 in connection with the shape of each opening 140. The number of the cells 120 within the housing 130 depends upon the nature of the load intended for the battery 110. The present invention is not dependent upon any particular configuration of the cells 120 or any particular number of the cells 120 within the housing 130. The battery 110 of FIGS. 4 and 6 is therefore a cut-away view of the metal-air battery housing 130 showing only the essential elements of the present invention, i.e., a housing 130, one or more cells 120, and the air openings 150, 160. Although only two cells 120 are shown, it is understood that the number and configuration of the cells 120 depends upon the power requirements for the battery 110.

A circulating fan 170 is provided for convective air flow both in and out of the housing 130. The term "fan" 170 is used herein to mean any device to move air. The capacity of the fan 170 depends upon the size of the housing 130 and the power demands of the battery 110. The fan 170 may be positioned within the housing 130 or adjacent to the housing 130 in communication with one of the openings 140. If the fan 170 is located within the housing 130, the ventilation openings 140 are positioned such that the inlet opening 150 and the outlet opening 160 are positioned on opposite sides of the fan 170. The only requirement for the positioning of the fan 170 and the openings 140 is that they are in sufficiently close proximity to each other to create a convective air flow into, through, and out of the housing 130. More than one fan 170 may be employed to ensure a sufficient pressure drop across the air exchanger 10.

Figure 5:
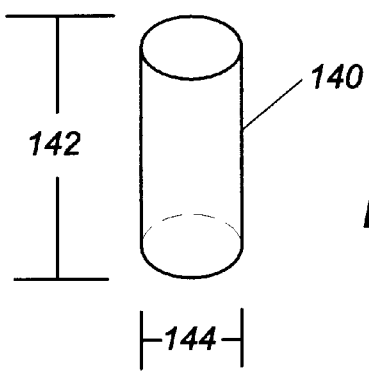
FIG. 5 is a diagrammatic pictorial view of a ventilation opening.

As is shown in FIG. 5, the ventilation openings 140 of the housing 130 are preferably sized such that their length 142, i.e., the direction through the thickness of the housing 130, is greater than their width 144, i.e., the direction perpendicular to the thickness of the housing 130. By using a large enough ratio between the length 142 and the width 144 for the ventilation openings 130, the diffusion of air through the openings 130, without the assistance of the fan 170 is substantially eliminated. As described above, the term "substantially eliminated" means that the diffusion of oxygen, humidity, or contaminates through the openings 140 is so slow that humidity transfer or drain current is sufficiently small and has little appreciable impact on the efficiency or life time of the battery 110. The openings 140 are sufficiently long and narrow to provide a barrier to the diffusion of gasses therethrough when the fan 170 is turned off.

The required ratio between the length 142 and the width 144 is at least about two to one. This ratio is sufficient to prevent appreciable diffusion through the openings 140 when the fan 170 is turned off while providing convective air flow therethrough when the fan 170 is turned on. The use of larger ratios between the length 142 and the width 144 is preferred. Depending upon the nature of the battery 110, the ratio can be more than two-hundred to one.

The plurality of the cells 120 within housing 130 are generally arranged such that a reactant air plenum 180 is positioned under the cells 120. The air plenum 180 generally defines an air plenum inlet 190, an air passageway 200, and an air plenum outlet 210. As is shown in FIG. 6, the fan 170 is generally positioned between and isolates the air plenum inlet 190 from the air plenum outlet 210 for efficient air flow through the housing 130. Examples of air plenum designs are shown in the commonly-owned references cited above and incorporated herein by reference. The present invention is not dependent upon any particular air plenum design.

In use, the air exchanger 10 is attached to the metal-air battery 110 via a flexible tubing 220. The flexible tubing 220 can be any type of conventional, substantially airtight tubing. The same material used for the housing 30 may be employed for the flexible tubing 220. The air exchanger 10 is connected to the metal-air battery 110 by connecting the battery out-port 80 of the air exchanger 10 to the air inlet 150 of the metal-air battery 110. Also, the battery in-port 100 of the air exchanger 10 is connected via the tubing 220 to the air outlet opening 160 of the metal-air battery 110. When the fan 170 of the metal-air battery 110 is on, ambient air is drawn into the air exchanger 10 through the atmospheric air in-port 70. The air travels adjacent to the membrane 20 through the air channel 60 and out of the air exchanger 10 via the battery out-port 80. The air continues to travel through tubing 220 to the air inlet opening 150 of the housing 130. The air is drawn into the housing 130 by the fan 170 into the air plenum 180. The air enters the air plenum 180 through air plenum inlet 190, travels through the passageway 200 to provide the reactant air flow for the cells 120, and exits the air plenum 180 via the air plenum outlet 210. The air is then again drawn into the fan 170 where it either mixes with fresh incoming ambient air or is forced out of the housing 130 via the air outlet 160. The air again travels through tubing 200 and into the air exchanger 10 via the battery in-port 100. The air again travels adjacent to the membrane 20 through the air channel 60 and exit via the atmospheric air out-port 90. Alternatively, the air exchanger may be positioned within the housing 130 such that the atmospheric air in-port 70 and the atmospheric air out-port 90 are connected directly to the air vents 140 on the inner side of the housing 130. The battery in-port 100 and the battery out-port 80 are positioned on opposite sides of the fan 170 for proper circulation.

As is shown in FIG. 2, the incoming air and the outgoing air travel through the air channel 60 on opposite sides of the membrane 20 in a counter-current fashion. Because the membrane 20 is water vapor selective, the level of humidity between the incoming air and the outgoing air is substantially equalized such that the air entering the housing 130 is approximately at the same humidity level as the air leaving the housing 130. For example, if the ambient air is relatively dry as compared to the air within the housing 130, the dry ambient air becomes progressively more humid as it passes through the length of the air channel 60. Although the membrane 20 is water vapor permeable, the membrane 20 is selective for water vapor transport over oxygen transport. In other words, the incoming air stream is not stripped of its oxygen content while the humidity level within the housing 30 is maintained.

Figure 7:
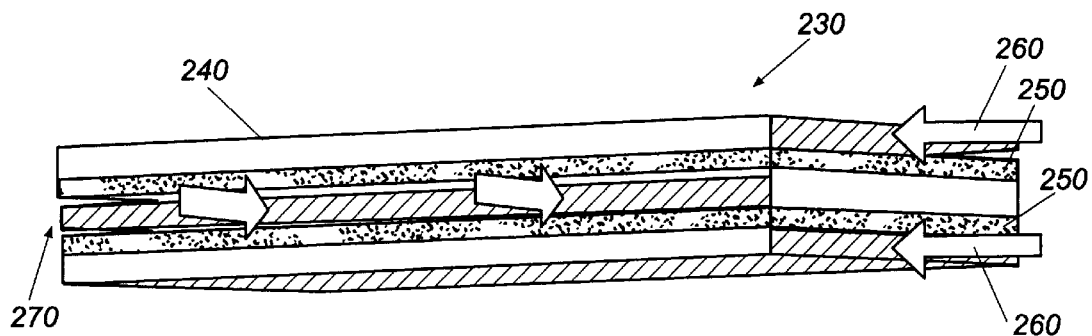
FIG. 7 is a partial cross-sectional view of the flat sheet membrane sandwich air exchanger layers.

FIG. 7 shows a further embodiment of the flat sheet air exchanger 10. This embodiment shows a flat sheet membrane "sandwich" 230. The membrane sandwich 230 includes a hollow housing 240 with two membrane layers 250 extending within the housing 240. These membrane layers 250 form three air channels, incoming channels 260 and outgoing channel 270 for a counter-current air flow. The size of the two (2) incoming channels 260 and the one (1) outgoing channels 270 are about the same. (The relative directions of the channels 260, 270 is not significant.) This sandwich 230 configuration provides twice as much membrane surface area as compared to the first embodiment. More than two (2) membrane layers 250 may be used. This embodiment also uses the same battery air-ports 70, 80, 90, 100 described above and is used in the same manner.

Cylindrical Hollow Fiber Air Exchanger

Figure 8:
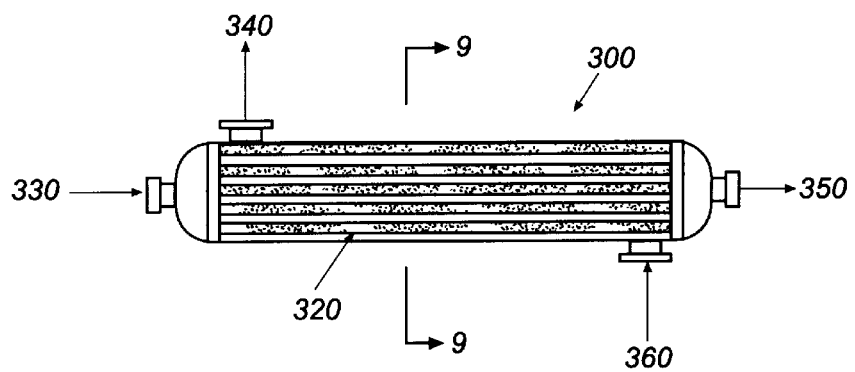
FIG. 8 is a plan view of the cylindrical hollow fiber air exchanger.
Figure 9:
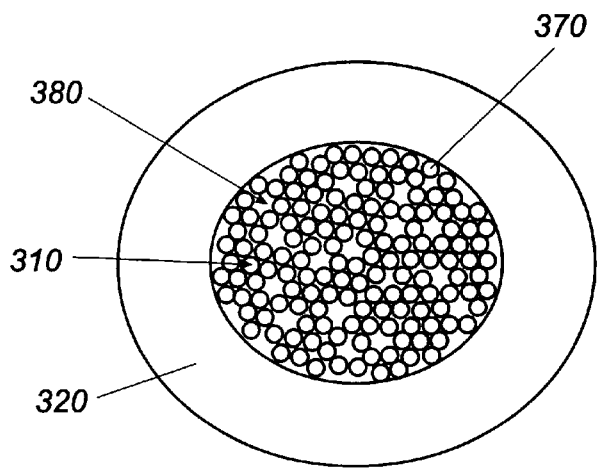
FIG. 9 is a partial cross-sectional view of the membrane in the cylindrical hollow fiber air exchanger.

FIGS. 8 and 9 show a further embodiment of the present invention. These figures show a cylindrical hollow fiber air exchanger 300. The hollow fiber air exchanger 300 has a plurality of hollow fiber membranes 310 within an outer casing 320. As with the flat sheet air exchanger 10, the hollow fiber air exchanger 300 includes an atmospheric air in-port 330, an atmospheric air out-port 340, a battery out-port 350 and a battery in-port 360. The hollow fiber membranes 310 form a plurality of fiber lumens or air passageways 370 through which the incoming air travels from the atmospheric air in-port 330 to the battery in-port 360. After the air has traveled through the battery 110 as described in the first embodiment, the air returns through the battery out-port 350. The air then travels through the casing 320 in a gas flow space 380 adjacent to and in-between the air passageways 370 of the hollow fiber membranes 310. The air then exits the air exchanger 300 via the atmospheric air out-port 340. As is shown, this air exchanger 300 design incorporates a "cross-flow" arrangement more than a counter-current flow of the flat sheet design of the air exchanger 10.

Flat Hollow Fiber Air Exchanger

Figure 10:
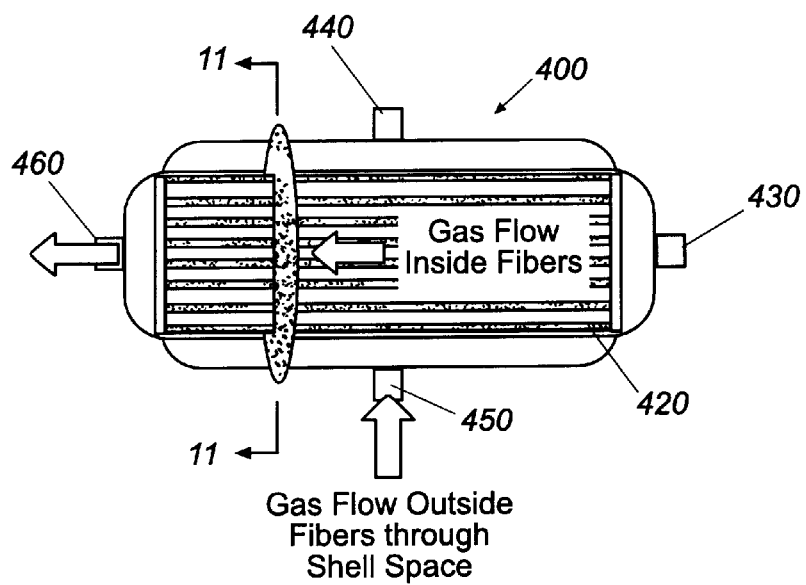
FIG. 10 is a plan view of the flat hollow fiber air exchanger.
Figure 11:
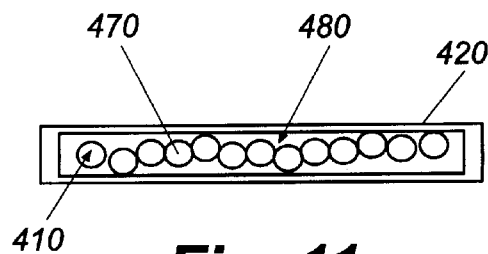
FIG. 11 is a partial cross-sectional view of the membrane in the flat hollow fiber air exchanger.

FIGS. 10 and 11 show a further embodiment of the present invention. These figures show a flat hollow fiber air exchanger 400. The flat hollow fiber air exchanger 400 is largely rectangular in shape as opposed to the largely tubular cylindrical hollow fiber air exchanger 300. As with the cylindrical hollow fiber air exchanger 300, the flat hollow fiber air exchanger 400 has a plurality of hollow fiber membranes 410 within an outer casing 420. As with the previous embodiments, the flat hollow fiber air exchanger 400 includes an atmospheric air in-port 430, an atmospheric air out-port 440, a battery out-port 450 and a battery in-port 460. The hollow fiber membranes 410 form a plurality of air passageways 470 through which the incoming air travels from the atmospheric air in-port 430 to the battery in-port 460. After the air has traveled through the battery 110 as described in the first embodiment, the air returns through the battery out-port 450. The air then travels through the casing 420 in a gas flow space 480 adjacent to and in-between the air passageways 470 of the hollow fiber membranes 410. The air then exits the air exchanger 400 via the atmospheric air out-port 440. This design also incorporates the cross-flow configuration.

Figure 12:
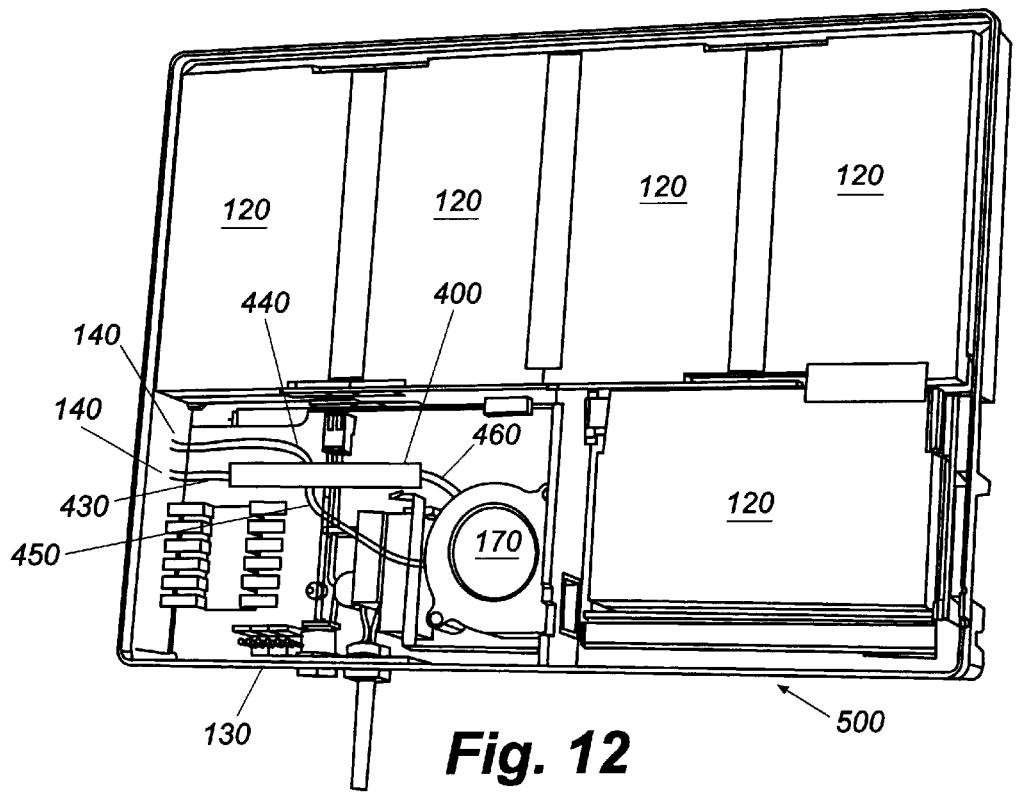
FIG. 12 is a cut-away diagrammatic view of the battery housing embodying the present invention, showing the position of the cells, the fan, and the air exchanger module.

The flat hollow fiber design may be preferred with certain battery housing designs because of its flat shape. The flat design allows the air exchanger 400 to be placed within the housing of the battery 110 in a more space efficient manner so as to minimize the overall size and weight of the battery. For example, FIG. 12 shows a battery 500 sold under the mark "PowerSlice PrO®" by AER Energy Resources, Inc. of Symrna, Ga., the assignee of the present invention. This design is a ten (10) cell 120 twelve (12) volt battery.

The air exchanger 400 fits in a thin space within the housing 130 of the battery 500. Although the air exchanger 400 is shown adjacent to the fan 170, it is understood that the air exchanger 400 may be located anywhere within the housing 130 that is accessible to the outside air. Because the air exchanger 400 is positioned within the housing 130, the atmospheric air in-port 430 and the atmospheric air out-port 440 are connected directly to the air vents 140. The battery in-port 460 and the battery out-port 450 are positioned on opposite sides of the fan 170 for proper circulation.

EXAMPLES

Humidity Control

Flat Sheet Design

Figure 13:
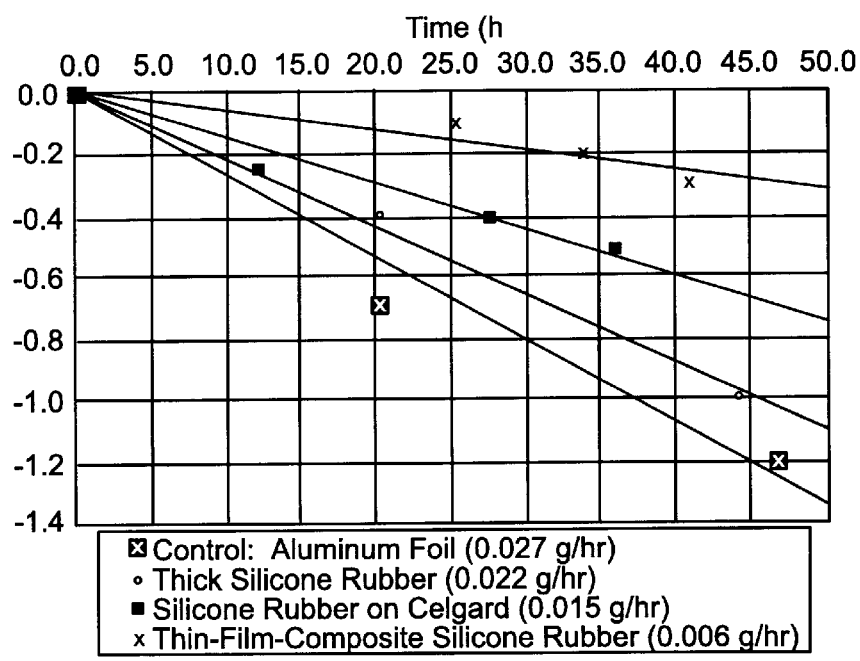
FIG. 13 is a chart showing the rate of water loss from a KOH solution for various membrane materials

Using the flat sheet air exchanger 10 with a membrane 20 having a surface area of about 46 $cm^2$, various types of membrane materials are tested in FIG. 13. Dry atmospheric air is drawn through the air exchanger 10 at 0.021 liters per minute, after which the air goes into the metal-air battery housing 30 where it is circulated past electrolyte reservoirs of fifty percent (50%) KOH in water. The metal-air housing 30 (but not the air exchanger 10) is maintained at 48° C. in an oven. The air exits the housing 30 at a rate of 0.021 liters per minute and is fed back through the air exchanger 10. The outgoing air stream flows on the opposite side of the membrane 20 from the incoming air stream. The mass of the KOH solution is monitored as a function of time to determine the effectiveness of the various membrane materials for water exchange between the two counter-currently flowing air streams.

The first test was run using an aluminum foil membrane material as a control. The aluminum foil does not pass water and thus results in the upper limit for water loss from the KOH solution, or about 0.027 grams per hour. The TFC silicone-rubber material was the most effective membrane in reducing water loss from the KOH, at about 0.006 g/hr. Relative to the control aluminum foil, the water loss from the KOH solution was reduced by a factor of about 4.5. The thick silicone-rubber membrane reduced water loss from the control by only about twenty percent (20%), or about 0.022 g/hr. The thick silicone-rubber membrane has a much lower water-vapor flux such that less water vapor is exchanged between the counter-currently flowing streams as they pass through the air exchanger 10. The membrane made from coating silicone rubber on CELGARD® had an intermediate performance of about 0.015 g/hr, between the performance of the TFC membrane and the thick silicone-rubber membrane.

In a subsequent experiment, the silicone/CELGARD® membrane 20 in the air exchanger 10 was placed in the oven along with the fifty percent (50%) KOH solution in the housing 130. In this experiment, the water-vapor loss from the KOH solution was significantly reduced, from a loss of 0.015 grams per hour when the membrane was at room temperature to a loss of 0.0033 grams per hour at 48° C. This result is likely due to the fact that the diffusion rate of water vapor is accelerated when the membrane is in a warm environment. As a result, more water vapor is transported from the humid exit stream to the dry incoming stream. In this case, the improvement is greater than four-fold over the control.

In a further experiment, a humid air stream was fed into the air exchanger 10 at 48° C. (with both the air exchanger 10 and the housing 30 in the oven). With the control aluminum foil membrane, the water uptake rate was greater than 0.017 grams per hour. When this impermeable aluminum foil material was replaced with the silicone/CELGARD® membrane, the water uptake rate was reduced to essentially zero (0), i.e., no measurable weight gain in the KOH solution over three (3) days. This test establishes that the membrane 20 functions to dehumidify the humid incoming stream by stripping water vapor out of the stream into the more dry (less humid) stream that exits the KOH solution. In sum, the air exchanger 10 humidifies the dry incoming air streams as well as dehumidifies a humid incoming air stream. The air exchanger 10 acts to maintain the incoming air stream at the same humidity condition as the air stream that exits the housing 30.

Because the function of the air exchanger 10 is the same for both water vapor and oxygen, the preferred membrane is highly selective for water transport relative to oxygen transport. The silicone-rubber based membranes are preferred for this function. If the membrane 20 is sufficiently selective and of the appropriate size, a considerable amount of water vapor will be transported whereas only a small amount of oxygen will be transported.

Hollow Fiber Designs

Similar experiments have been run using the hollow fiber air exchanger 300. As is shown in FIG. 14, the use of several hollow fiber membrane designs having an area of about 410 $cm^2$ are compared to the flat sheet membrane design having an area of 160 $cm^2$. The hollow fiber air exchanger 300 is about fifteen (15) centimeters long and about two (2) centimeters in diameter. Both dry and humid air streams were fed into the respective air exchangers 10, 300 at a flow rate of 2.1 liters per minute past the reservoirs of about forty-five percent (45%) KOH in water. Because of its design, the hollow fiber air exchanger 300 has over twice the surface area of the flat air exchanger 10. As a result, the reduction in water loss with the silicone rubber on polysulfone material relative to the control aluminum foil material was about two-fold. Even more improvement was shown with the use of a polyamide thin-film composite on polysulfone material.

Similar results have been obtained with the flat hollow fiber air exchanger 400.

Oxygen Control

The final experiment focused on the loss of oxygen from the incoming air stream as it passes through the air exchanger 300. The air exchanger 300 has a silicone rubber (PDMS) on polysulfone material membrane 320 of about 410 cm$^2$ in surface area. Dry helium was fed at two (2) liters per minute in one direction through the air exchanger 300 while air at a relative humidity of about sixty percent (60%) was fed at the same rate in the other direction at 30° C. Using a gas chromatography process, the relative concentrations of oxygen, water, and nitrogen in the air streams were determined. The incoming air stream had an oxygen count of approximately 210,000, a water count of approximately 46,600, and a nitrogen count of approximately 850,000. The incoming helium stream had zero (0) counts of oxygen, water, and nitrogen. The helium out stream had an oxygen count of approximately 2000, a water count of approximately 34,200 and a nitrogen count of approximately 6,300. The air out stream had an oxygen count of approximately 208,500, a water count of 5,400 and a nitrogen count of 835,000.

From these measurements, the oxygen loss from the incoming air stream to the helium stream is very low, less than about one percent (1%). This figure is expected to be even smaller when an oxygen rich stream is compared to a merely oxygen depleted stream as opposed to this stream that completely lacked oxygen. The water recycled by the helium stream is also significant, about sixty-five to seventy-five percent (65–75%). This figure, however, is expected to be somewhat lower when compared to an outgoing air stream containing some humidity. Further experiments with a 40° C. air stream did not result in significantly different performance.

Conclusion

In sum, humidity control in the metal-air battery 110 is accomplished both when the fan 170 is on and off. When the fan 170 is turned off, the long narrow vent openings 140 substantially eliminate humidity transfer through the housing 130. When the fan is turned on, the air exchanger 10, 230, 300, 400 of the present invention acts to humidify dry air and to dehumidify wet, humid air. The humidity level of the incoming air stream and the outgoing air stream are essentially the same such that there is no net transfer of humidity into or out of the battery 110.

It is important to note that although the present invention has been discussed in terms of a "counter-current" or a "cross-flow" air exchanger, it will be understood that a co-current flow or other types of flows also would adequately maintain the humidity level in the battery 110. The direction of the respective air flows is not as important as the permeability and selectivity of the membrane materials.

It should be understood that the forgoing relates only to the preferred embodiments of the present invention, and that numerous changes may be made therein without departing from the spirit and scope of the invention as defined by the following claims.

I claim:

1. A humidity control system for a metal-air battery, comprising:

at least one metal-air cell;

said at least one metal-air cell positioned within an air manager;

said air manager comprising at least one air inlet and at least one air outlet; and humidity control means in communication with said air manager for maintaining the humidity level of the air entering said air manager substantially equivalent to the humidity level of the air leaving said air manager.

2. The humidity control system of claim 1, wherein said humidity control means comprises a housing.

3. A method for controlling the level of humidity in a metal-air battery having an air exchanger, said air exchanger having an air inflow path, an air outflow path, and a membrane positioned between said air flow paths, comprising the steps of:

drawing the air through said air inflow path of said air exchanger into said battery;

circulating the air through said battery for an electrochemical reaction;

forcing the air out of said battery back through said air out flow path of said air exchanger; and transferring the water vapor between the air in said inflow path and the air in said outflow path through said membrane such that the level of humidity within said battery remains substantially constant.

4. A humidity control system, comprising:

at least one metal-air cell:

said at least one cell comprising an electrolyte reservoir;

said at least one metal-air cell positioned within an air manager;

said air manager comprising at least one air inlet and at least one air outlet and said air manager comprising a fan; and humidity control means comprising a hollow fiber membrane, said humidity control means in communication with said air manager such that the humidity level of the air entering said air manager is substantially equivalent to the humidity level of the air leaving said air manager.

5. The humidity control system of claim 4, wherein said hollow fiber membrane comprises silicone rubber on polysulfone.

6. The humidity control system of claim 4, wherein said hollow fiber membrane comprises polyamide thin-film composite on polysulfone.

7. A humidity control system, comprising:

at least one metal-air cell;

said at least one metal-air cell positioned within an air manager;

said air manager comprising at least one air inlet and at least one air outlet; and humidity control means comprising a housing;

said housing comprising an ambient air passageway for a first flow of air in a first direction and a battery exhaust passageway for a second flow of air in a second direction such that the humidity level of the air entering said air manager is substantially equivalent to the humidity level of the air leaving said air manager.

8. The humidity control system of claim 7, wherein said humidity control means comprises one or more membranes such that said ambient air passageway and said battery exhaust passageway are separated within said housing by said one or more membranes.

9. The humidity control system of claim 8, wherein said first and said second flows of air comprise counter-current air flows.

10. The humidity control system of claim 8, wherein said first and said second flows of air comprise cross-current air flows.

11. The humidity control system of claim 8, wherein said one or more membranes comprise a water-vapor permeable polymer.

12. The humidity control system of claim 11, wherein said one or more membranes comprise water vapor permeability of at least about 50 barrer.

13. The humidity control system of claim 8, wherein said one or more membranes comprise a polymer that is selective for water vapor transport over oxygen transport.

14. The humidity control system of claim 13, wherein said one or more membranes comprise a water-vapor/oxygen selectivity of more than about 80.

15. The humidity control system of claim 8, wherein said one or more membranes comprise a hydrogel.

16. The humidity control system of claim 8, wherein said one or more membranes comprise a material selected from the group comprising of cellulose hydrate (regenerated cellulose), ethyl cellulose, polyamide, polydimethylsiloxane, polyethylmethacrylate, polymethylmethacrylate, and poly-vinyl alcohol.

17. The humidity control system of claim 8, wherein said housing comprises a rectangular shape with two identical halves and wherein said ambient air passageway and said battery exhaust passageway comprise a central channel through said housing.

18. The humidity control system of claim 17, wherein said one or more membranes comprise a flat sheet shape and wherein one of said one or more membranes is positioned between said two halves of said housing.

19. The humidity control system of claim 17, wherein said one or more membranes comprise a flat sheet shape and wherein a first one of said one or more membranes is positioned on a first side of said ambient air passageway adjacent to a first battery exhaust passageway and a second one of said one or more membranes is positioned on a second side of said ambient air passageway adjacent to a second battery exhaust passageway.

20. The humidity control system of claim 17, wherein said one or more membranes comprise a flat sheet shape and wherein a first one of said one or more membranes is positioned on a first side of said battery exhaust passageway adjacent to a first ambient air passageway and a second one of said one or more membranes is positioned on a second side of said battery exhaust passageway adjacent to a second ambient air passageway.

21. The humidity control system of claim 8, wherein said housing comprises a hollow casing.

22. The humidity control system of claim 21, wherein said hollow casing comprises a tubular shape.

23. The humidity control system of claim 21, wherein said hollow casing comprises a rectangular shape.

24. The humidity control system of claim 8, wherein said one or more membranes comprise a plurality of hollow fibers.

25. The humidity control system of claim 24, wherein said plurality of hollow fibers comprise said ambient air passageway within said hollow casing.

26. The humidity control system of claim 24, wherein said plurality of hollow fibers comprise said battery exhaust passageway within said hollow casing.

27. The humidity control system of claim 24, wherein said ambient air passageway comprises a space within said housing not occupied by said plurality of hollow fibers.

28. The humidity control system of claim 24, wherein said battery exhaust passageway comprises a space within said housing not occupied by said plurality of hollow fibers.

29. A humidity control system for a metal-air battery, comprising:
    a housing for enclosing at least one metal-air cell;
    said housing having at least one air inlet for ambient air and at least one air outlet for exhaust air;
    a fan positioned in communication with said housing to force the air into said air inlet and out of said air outlet; and
    an air exchanger positioned in communication with said housing;
    said air exchanger comprising at least one air inflow path and at least one air outflow path and further comprising at least one membrane for defining said air flow paths;
    said air inlet connected to said air inflow paths and said air outlet connected to said air outflow paths such that the ambient air entering said housing and the exhaust air leaving said housing have a substantially equivalent humidity level.

30. The humidity control system of claim 29, wherein said air inflow paths and said air outflow paths comprise counter-current air flow paths.

31. The humidity control system of claim 29, wherein said air inflow paths and said air outflow paths comprise cross-current air flow paths.

32. The humidity control system for a metal-air battery of claim 29, wherein said inlets comprise a length in the direction through the thickness of said housing greater than a width in the direction perpendicular to said thickness of said housing.

33. The humidity control system for a metal-air battery of claim 29 wherein said membrane comprises a water-vapor permeable polymer.

34. The humidity control system for a metal-air battery of claim 29, wherein said membrane comprises a polymer that is selective for water vapor transport over oxygen transport.

35. The humidity control system for a metal-air battery of claim 29, wherein said membrane comprises a hydrogel material.

36. The humidity control system for a metal-air battery of claim 29, wherein said one or more membranes comprise a material selected from the group comprising of cellulose hydrate (regenerated cellulose), ethyl cellulose, polyamide, polydimethylsiloxane, polyethylmethacrylate, polymethylmethacrylate, and poly-vinyl alcohol.

* * * * *

UNITED STATES PATENT AND TRADEMARK OFFICE
CERTIFICATE OF CORRECTION

PATENT NO. : 6,087,029
DATED : July 11, 2000
INVENTOR(S) : Golovin et al.

It is certified that error appears in the above-identified patent and that said Letters Patent is hereby corrected as shown below:

Title page, [56] References Cited, FOREIGN PATENT DOCUMENTS, insert the following:

--54-61350   5/1979   Japan--.

Column 13, line 9, "barrer" should read --barrier--.

Signed and Sealed this

Tenth Day of April, 2001

Attest:

NICHOLAS P. GODICI

Attesting Officer        Acting Director of the United States Patent and Trademark Office

UNITED STATES PATENT AND TRADEMARK OFFICE
CERTIFICATE OF CORRECTION

PATENT NO. : 6,087,029
DATED : June 11, 2000
INVENTOR(S) : Golovin et al.

It is certified that error appears in the above-identified patent and that said Letters Patent is hereby corrected as shown below:

Column 13,
Line 9, "barrier" should read -- barrer --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*